United States Patent
Pfister

(10) Patent No.: US 8,631,692 B2
(45) Date of Patent: Jan. 21, 2014

(54) METHOD AND TEST PLATFORM FOR DEVELOPING A MOTOR VEHICLE WITH SEVERAL POWERED AXLES

(75) Inventor: Felix Pfister, Graz (AT)

(73) Assignee: AVL List GmbH, Graz (AT)

(*) Notice: Subject to any disclaimer, the term of this patent is extended or adjusted under 35 U.S.C. 154(b) by 0 days.

(21) Appl. No.: 13/067,932

(22) Filed: Jul. 7, 2011

(65) Prior Publication Data
US 2012/0006108 A1  Jan. 12, 2012

(30) Foreign Application Priority Data
Jul. 12, 2010  (AT) .......................... GM 441/2010 U

(51) Int. Cl.
G01M 15/00 (2006.01)
G06F 19/00 (2011.01)

(52) U.S. Cl.
USPC ....................................... 73/115.07

(58) Field of Classification Search
USPC .................. 73/115.07, 115, 115.01; 701/70
See application file for complete search history.

(56) References Cited

U.S. PATENT DOCUMENTS

| | | | | |
|---|---|---|---|---|
| 4,438,944 A * | 3/1984 | Della-Moretta | ........... | 280/446.1 |
| 4,575,110 A * | 3/1986 | Kuhn et al. | ................. | 280/446.1 |
| 6,659,491 B2 * | 12/2003 | Green | ........................ | 280/423.1 |
| 7,253,721 B2 * | 8/2007 | Flohr et al. | .................... | 340/431 |
| 7,734,405 B2 * | 6/2010 | Tandy et al. | .................... | 701/70 |
| 7,743,859 B2 * | 6/2010 | Forsyth | ........................ | 180/65.1 |
| 7,770,909 B2 * | 8/2010 | Anderson et al. | ............. | 280/432 |
| 8,214,108 B2 * | 7/2012 | Post et al. | ........................ | 701/48 |
| 8,215,436 B2 * | 7/2012 | DeGrave et al. | .............. | 180/165 |
| 2002/0095251 A1 * | 7/2002 | Oh et al. | ......................... | 701/70 |
| 2002/0107627 A1 * | 8/2002 | Funke et al. | .................... | 701/70 |
| 2009/0093928 A1 * | 4/2009 | Getman et al. | .................. | 701/37 |
| 2011/0029210 A1 * | 2/2011 | Wu et al. | .......................... | 701/70 |
| 2011/0257860 A1 * | 10/2011 | Getman et al. | .................. | 701/70 |
| 2012/0006108 A1 * | 1/2012 | Pfister | ........................ | 73/115.07 |
| 2012/0041659 A1 * | 2/2012 | Greene | .......................... | 701/70 |

FOREIGN PATENT DOCUMENTS

| | | |
|---|---|---|
| DE | 102004029661 | 1/2006 |
| FR | 2902048 | 12/2007 |
| SU | 1176202 | 8/1985 |

OTHER PUBLICATIONS

English Abstract of FR2902048 (see WO 2007/144526).
English Abstract of DE102004029661.

* cited by examiner

*Primary Examiner* — Lisa Caputo
*Assistant Examiner* — Jamel Williams
(74) *Attorney, Agent, or Firm* — Dykema Gossett PLLC

(57) ABSTRACT

To simplify the development of a hybrid vehicle the invention envisions simulating the hybrid vehicle by using a test vehicle 1 comprising a first axle 5 that is powered by a combustion engine and a second passive, non-powered axle 6, and wherein the axle that is present in the real hybrid vehicle and powered by an electric motor is simulated on the test vehicle 1 by an active secondary vehicle 2 that is hooked up to the test vehicle 1 and that is equipped with its own drive 3 and additionally to the combustion engine brakes and/or pushes the test vehicle 1, and wherein the secondary vehicle 2 is connected with a control device 7 of the test vehicle 1.

4 Claims, 2 Drawing Sheets

METHOD AND TEST PLATFORM FOR DEVELOPING A MOTOR VEHICLE WITH SEVERAL POWERED AXLES

BACKGROUND OF THE INVENTION

1. Field of the Invention

The subject matter of the invention relates to a method and a test platform for developing a vehicle with several powered axles.

2. The Prior Art

Vehicle manufacturers today develop motor vehicles having one axle (typically the front axle) that is powered by a combustion engine and another axle (typically the rear axle) that is powered by one or several electric motors (for example, for single wheel drive systems), so-called hybrid vehicles. For the development of such a hybrid vehicle, the automobile must be equipped with both drive systems, which means the hybrid must be set up completely; however, this is an undertaking involving great complexity and expense, especially if any changes must be implemented on the test vehicle. In purely electrically powered vehicles it is possible to drive the front axle as well as the rear axle(s) independently by their own electric motors. An axle can also by powered by a single-wheel drive system.

In the development stage of motor vehicles it is necessary to create certain driving states in order to test how a vehicle behaves under certain conditions. This can be done on special test stands, for example roller dynamometers, or on test tracks (whether in the form of a real roadway or a special test terrain is not important in this context). Both options have advantages and disadvantages. Test stands do not necessarily allow for any type of duplication that may be desired because they are unable to simulate real ambient conditions with every degree of accuracy. Therefore, testing on a test stand can always only give indications as to the real behavior of the motor vehicle on the real roadway (even when the real conditions are approximated very closely). A test track, in contrast, is naturally limited in terms of its possibilities dependent on its course through different environments, routes, etc. Consequently, it is not possible to generate any unlimited number of desired driving states on a test track. Moreover, testing on a test track depends in most cases also on environmental conditions (temperature, moisture) and the test driver (clutching times, pedal position(s), steering angle, etc.) and is thus not completely reproducible. Nevertheless, by choosing varied test tracks (for example, a route through an urban area or a high Alpine road, the "Grossglockner mountain road") it is, of course, possible to carry out different test runs on different types of roadways which, as any observer will understand, is a complex undertaking and only possible with limitations.

The object of the present invention is, therefore, to describe a method for developing a motor vehicle that has several powered axles and a related test platform allowing for such a vehicle to be developed simply, quickly as well as cost-effectively and independently of a test track.

SUMMARY OF THE INVENTION

The object is achieved according to the invention by providing a test vehicle that comprises a first powered axle and a second passive, non-powered axle, and wherein the second powered axle that is present in the real vehicle is simulated on the test vehicle by an active secondary vehicle that is hooked up to the test vehicle, and which is equipped with its own drive and by which the test vehicle is braked and/or pushed additionally to the drive action of the first axle, and wherein the secondary vehicle is connected with a control device of the test vehicle. With the secondary vehicle it is now possible to apply to the test vehicle any desired additional forces in the longitudinal direction, and by which it is possible to simulate a second powered axle of the test vehicle. To this end, the secondary vehicle must be connected with a control device of the test vehicle with which it is then able to exchange corresponding control signals and/or other data (such as measured data, data relating to the operation of the vehicle, etc.), which makes it possible to feign that the test vehicle has a second powered axle that can actually be triggered, and whereby it is possible to simulate a vehicle having several powered axles. Moreover, the secondary vehicle allows for simulating and testing the most varied driving situations independently of a test track, because the application of forces of any kind is possible. This way, other influences, for example due to the test driver, can be excluded or at least weakened because the secondary vehicle is able to compensate for any deviations that are due to the test driver, be it completely or in part.

Preferably, the secondary vehicle is connected to the control device via a vehicle bus; this bus is normally present, and whereby real conditions are created and it is possible to forego a separate interface between the secondary vehicle and the test vehicle.

To be able to apply additional transverse forces and/or moments to the test vehicle, it can be envisioned that at least one wheel on each side of the secondary vehicle is accelerated or decelerated in an individualized fashion per wheel. This allows for the adjustment of further driving states, thereby expanding the testing possibilities considerably.

If the secondary vehicle is connected by a four-bar linkage to the vehicle and one coupling point of the four-bar linkage and/or the length of a linkage of two associated coupling points is adjusted, it is possible to apply, additionally or optionally, transverse forces and/or moments to the vehicle very easily. This can also be achieved if one axle of the secondary vehicle is steerable.

By the possibility(-ies) of applying transverse forces and moments, an improvement of the driving stability of the vehicle and/or the secondary vehicle during the test run is made feasible.

BRIEF DESCRIPTION OF THE DRAWINGS

The invention will be described in further detail using the attached exemplary, schematic and non-limiting figures which depict advantageous embodiments of the invention

DETAILED DESCRIPTION OF THE PREFERRED EMBODIMENTS

Figure 1:
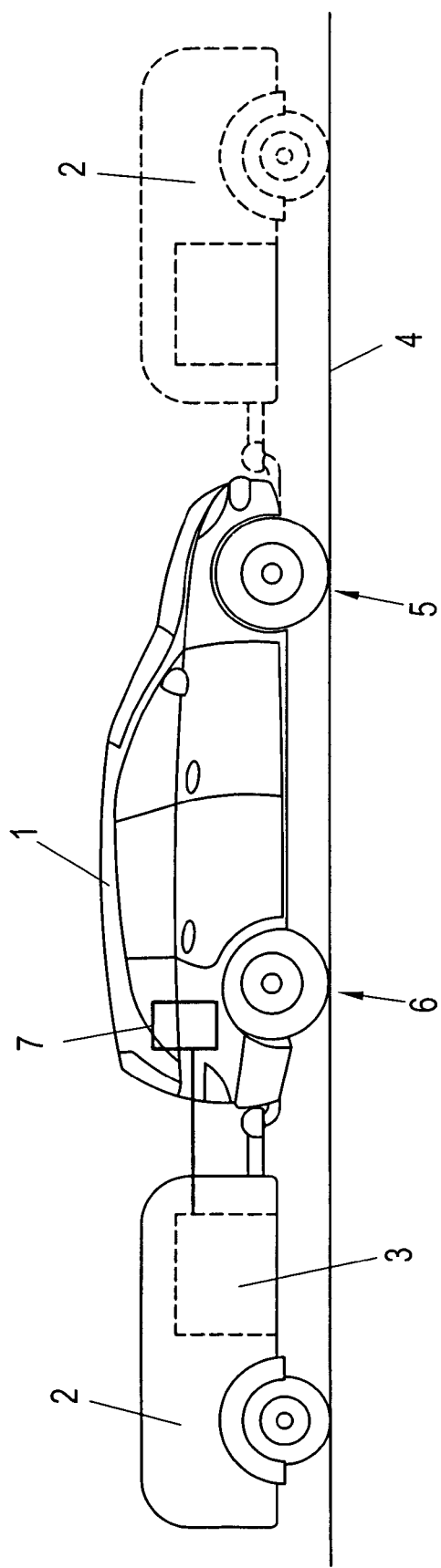
FIG. 1 shows a test platform according to the invention with a test vehicle and a secondary vehicle.

FIG. 1 shows a typical test constellation for the development of a motor vehicle having several powered axles, for example a hybrid vehicle with combustion engine for a first axle and an electric motor for a second axle. A test vehicle 1 is used to this end that drives on test track 4, for example a real street or a course through a test terrain, performing certain driving maneuvers that are necessary for the development of the vehicle, for example in order to test a certain behavior of the vehicle such as, for example, fuel consumption, emissions, drivability, durability, NVH (=noise, vibration, harshness), etc., or to implement certain development tasks on the vehicle such as, for example, the development of functions in the control device and/or control device assembly. A certain number of sensors can be disposed on the test vehicle 1 for this purpose; they are able to detect and evaluate certain measured values of the test vehicle 1 or the environment (torque, speed, yaw rate, speeds, etc.).

The test vehicle 1 has a first axle 5, for example, the front axle that is powered in the conventional manner by a (not shown) combustion engine or electric motor of the test vehicle 1. The second axle 6 of the test vehicle 1, in the present instance the rear axle, is passive, which means it is not powered. In order to simulate a second axle of the test vehicle 1, for example powered by an electric motor, which is in the present instance the rear axle, an active secondary vehicle 2 is connected to the test vehicle like a trailer. The secondary vehicle 2 comprises an independent drive and load device 3 by which the secondary vehicle 2 can be decelerated or accelerated. The type of the drive and load device 3 is not important in this context; it can be, for example, a combustion engine, an electric device such as, for example, an electric synchronous machine, etc. In fact, of importance is only as to whether the secondary vehicle 2 is able to generate a force in the longitudinal direction of the test vehicle 1, meaning acceleration or deceleration force. In this context it is not important as to whether the secondary vehicle 2 has a single axle, a twin axle or two or more axles. It is also conceivable that only one axle or that several axles of the secondary vehicle 2 are powered. Naturally, it is also possible to provide further units for the energy supply of a drive 3 on the secondary vehicle 2 such as, for example, a battery or a fuel cell and/or units for triggering the drive and load device 3 such as, for example, suitable power electronics. But, naturally, it is also conceivable that different units are provided on the secondary vehicle 2 as drive and load device 3 for decelerating and accelerating such as, for example, an electric motor for driving and an eddy-current brake for braking. The secondary vehicle 2 could also be hooked up to the front of the test vehicle 1, as indicated by the perforated line in FIG. 1.

Using the secondary vehicle 2, it is possible to simulate a powered second axle of the test vehicle 1 (and thereby, for example, a hybrid vehicle) in that the forces that are generated normally by the real drive of the second axle, for example by an electric motor of a real hybrid vehicle, are generated by the secondary vehicle 2 and transferred to the test vehicle 1. The passive rear axle 6 of the test vehicle 1 is not in the way during this. For the secondary vehicle 2 to be able to have the same effect like the powered second axle of the test vehicle 1, for example the electrified axle of the hybrid vehicle, the secondary vehicle 2 must be connected to a control device 7 of the test vehicle 1 that is preferably a real control device 7 of the vehicle that is to be developed. This way, the secondary vehicle 2 receives the control commands from the control unit 7 of the test vehicle 1 (and thereby the same commands as in the real vehicle), thereby becoming the powered second axle of the test vehicle 1. Consequently, the test vehicle 1 is thereby deceived into 'thinking' that it is, for example, a real hybrid vehicle which makes it possible to conduct tests on the simulated hybrid vehicle without having to use a completely set up hybrid vehicle.

A modern vehicle typically contains a vehicle bus 13, for example a CAN bus, FlexRay bus, MOST bus, etc., that handles the communication between sensors, actuators and control devices of the vehicle (for example, the engine control unit (ECU), transmission control unit (TCU), hybrid control unit, brake control, etc.). The secondary vehicle 2 is therefore advantageously connected to a vehicle bus 13 of the test vehicle 1 in order to create a technical signal connection between secondary vehicle 2 and test vehicle 1. The secondary vehicle 2 is thus not only able to receive and send control data via the vehicle bus 13 but, for example, also measured values from different sensors or other data that are relevant for operational purposes, for example data related to the status of the vehicle battery, a fuel cell, etc.

Advantageously, it is possible to provide on each side of the secondary vehicle 2 at least one wheel, respectively having an individualized drive and load device 8, 9, for example, in the form of wheel hub motor. Utilizing such an individualized drive per wheel, it is possible to also apply transverse forces or moments around the vertical axis (yaw moments), aside from the longitudinal forces (braking, pushing (and/or pulling)), to the test vehicle 1. This provides a further degree of freedom for the tests that are to be conducted, and it is possible to simulate, for example, driving states with transverse forces and/or yaw moments in order to test, for example, the most varied driving stability systems (such as, for example, ABS, ESP, etc.).

But also possible is the testing of certain driving states, for example, jumping a curb during parallel parking (for example, for testing automatic parking aids).

Figure 2:
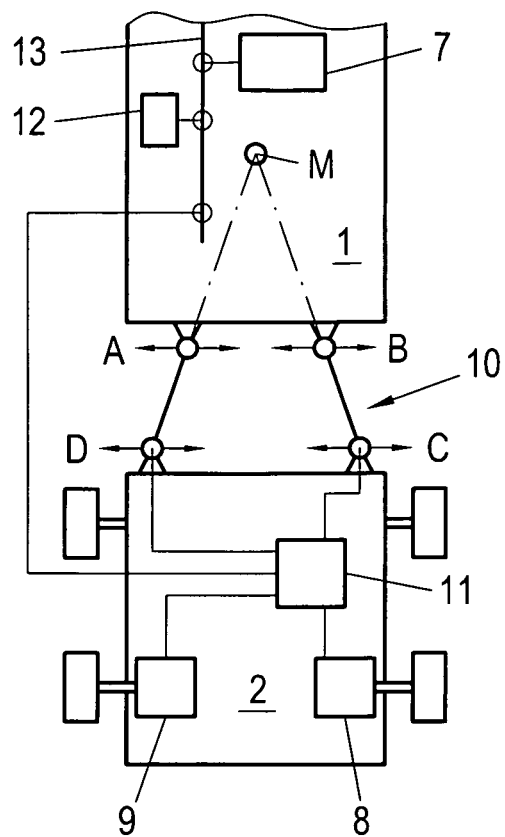
FIG. 2 shows the coupling connection of the secondary vehicle to the test vehicle by a four-bar linkage.
Figure 3:
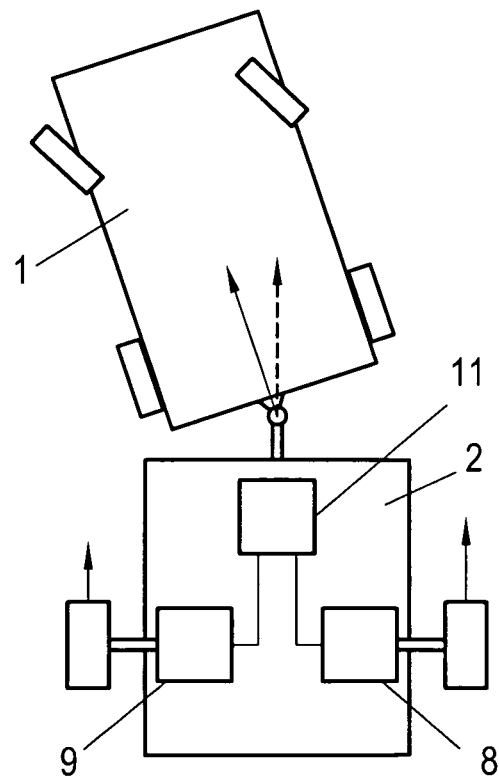
FIG. 3 shows a test vehicle with secondary vehicle driving through a curve.

The hook-up connection of the secondary vehicle 2 on the vehicle 1 can be achieved, for example, by conventional ball and socket trailer hitches as commonly used on passenger cars, or bolt-type trailer hitches with coupling mouth, eyelet and bolt or fifth wheel coupling and king pin, as is common on trucks. But it is also possible to provide a rigid coupling connection. Also conceivable are coupling connections with suitable kinematics such as, for example, by a known four-bar linkage 10, for example as shown in FIG. 2. Due to the geometry of the four-bar linkage 10, an instantaneous center of rotation M is created that is preferably placed for reasons of driving stability in the center of gravity or at least in the area of the center of gravity or the front axle of the test vehicle 1. The coupling points A, B, C, D of the four-bar linkage 10 can be fixed, but they can also be adjustable (as indicated in FIG. 3 by the double arrows). In this context, it is not important as to whether the coupling points are adjustable on the test vehicle 1, the secondary vehicle 2 or on both. As can be directly seen, due to the adjustment of the coupling points A, B, C, D, the position of the instantaneous center of rotation M changes, and thereby the application of force and/or moment to the test vehicle 1.

But an active (i.e., controlled) adjustment of the coupling points A, B, C, D can be utilized in order to apply further forces and/or moments to the test vehicle 1. To this end, the coupling points A, B, C, D, for example, are actively adjustable by a ball spindle or a hydraulic actuator. Depending on the resulting position of the instantaneous center of rotation M, the transverse forces and/or moments are applied to the test vehicle 1 during the deceleration or acceleration action of the secondary vehicle 2. Consequently, the selection of the position of the coupling points A, B, C, D or their active adjustment correspondingly creates additional forces and moments acting upon the test vehicle 1.

An adjustment of the position of the instantaneous center of rotation M by adjusting the length of the connecting rod between the coupling points A and D and/or B and C is also conceivable.

But the two independent drives 8, 9 that are provided on both sides of the secondary vehicle 2 can also be utilized to apply acceleration and deceleration forces in the longitudinal direction of the vehicle 1 while driving through a curve, for example as shown in FIG. 3. To this end, the independent drives 8, 9 are triggered accordingly in order to generate a force in the longitudinal direction of the test vehicle 1. But it is also possible to use the independently powered wheels of the secondary vehicle 2 to stabilize the secondary vehicle 2 in order to avoid swerving of the secondary vehicle 2 in certain driving situations.

The secondary vehicle 2 can also be executed as having a steered axle. This will also allow for applying transverse forces and/or moment to the test vehicle 1 or for stabilizing the test vehicle 1 or the secondary vehicle 2.

The secondary vehicle 2 can comprise a secondary-vehicle control unit 11 for the purpose of controlling the drive and load device(s) 3, 8, 9 and/or the geometry of the coupling connection that receives as input orders of magnitude different measured values from the sensors 12 that are installed on the test vehicle 1 and/or secondary vehicle 2 or that receives set values that can be predetermined. In the same way, the control unit of the secondary vehicle 11 receives control data from a control unit 7 of the test vehicle 1 for simulating a hybrid vehicle. The control unit 11 of the secondary vehicle therein can be connected to the vehicle bus 13, as indicated in FIG. 3. Naturally, it is also possible to provide a data bus on the secondary vehicle 2 for handling the internal data communication via said data bus. This internal data bus can be connected to the vehicle bus 13 in an easy manner.

The invention claimed is:

1. A method of developing a motor vehicle having a plurality of powered axles, said method comprising the steps of:
  (a) providing a primary vehicle having a first powered axle, a second non-powered axle and a control unit, said primary vehicle constituting a test vehicle for developing said motor vehicle,
  (b) providing a secondary vehicle which includes a drive means,
  (c) hooking up said secondary vehicle to said primary vehicle so that control commands from said control unit are received by the secondary vehicle, and
  (d) pushing and/or braking the primary vehicle using said secondary vehicle to simulate a second powered axle in the primary test vehicle, depending on the control commands from the control unit.

2. The method according to claim 1, wherein the primary vehicle includes a vehicle bus, and including the step of connecting the secondary vehicle to the vehicle bus of the primary vehicle.

3. The method according to claim 1, wherein the secondary vehicle includes at least one wheel on each side thereof, and including the step of accelerating or decelerating at least one wheel on each side of the secondary vehicle in an individualized manner per wheel.

4. The method according to claim 1, including hooking up the secondary vehicle to the test vehicle by a four-bar linkage, and adjusting a coupling point (A, B, C, D) of the four-bar linkage and/or a length of a linkage between two associated coupling points (A-D, B-C).

\* \* \* \* \*